Patented Feb. 1, 1949

2,460,606

UNITED STATES PATENT OFFICE 2,460,606

CREATINE AND CREATININE AS CATALYSTS FOR POLYMERIZATION OF BUTADIENE

William D. Stewart, Akron, Ohio, assignor to The B. F. Goodrich Company, New York, N. Y., a corporation of New York No Drawing. Application December 21, 1943, Serial No. 515,150

5 Claims. (Cl. 260—84.5)

This invention relates to the polymerization of unsaturated organic compounds which are capable of undergoing an addition polymerization to form high molecular weight linear polymers, and particularly to the polymerization in aqueous emulsion of conjugated butadienes either alone or in admixture with monomers copolymerizable therewith, such as styrene and acrylonitrile, to yield synthetic rubbers. The principal object of the invention is to provide a method for decreasing the time required to effect such polymerization reactions.

I have discovered that the time required to effect polymerization reactions may be decreased by polymerizing unsaturated organic compounds in the presence of an organic compound composed of non-metallic elements and containing a doubly bound carbon atom linked by a double bond to a non-metallic atom other than carbon, and being connected by at least two of its four valences to two different nitrogen atoms one of which is a nitrogen atom in turn connected by single bonds to hydrogen or carbon atoms, and the other of which is a nitrogen atom present in a group (other than an amido group) which contains only non-metallic atoms and is free from carbon atoms.

In accordance with this definition the compounds of this class will contain the characteristic structure

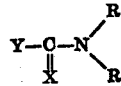

wherein X, Y and R are non-metallic structures such as atoms or groups and in addition X is free from carbon, at least one of X and Y is a group, other than an amido group, linked to the carbon by nitrogen and free from carbon atoms and R is hydrogen or an organic group linked to the nitrogen by carbon. It is to be noted that the nitrogen atom set forth in the above structure is connected by one of its valences to a carbon atom doubly bound to another non-metallic atom (that is, a carbon atom present in such structures as

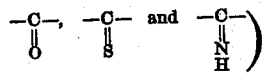

and is connected by each of its other two valences to hydrogen atoms or carbon atoms of organic groups.

When X in the above structure contains nitrogen as the atom doubly linked to carbon as in an =N—H or =N—OH group, the carbon atom is seen to be linked to two different nitrogen atoms one of which (the nitrogen set forth in the structure) is a nitrogen atom directly connected by single bonds to hydrogen or carbon, and the other of which (the nitrogen of the imide or oximide group) is a nitrogen present in a group, other than an amido group, which is free from carbon atoms. Accordingly when X is an imide group, Y may be any desired monovalent group composed of non-metallic elements including groups in which the free valence is attached either to carbon, or nitrogen such as aliphatic, aromatic and heterocyclic groups which may be either unsubstituted or substituted and which may form a ring structure with the remaining portion of the molecule.

On the other hand when X in the above structure consists of oxygen or sulfur as the atom linked to carbon, Y must then be a monovalent group, other than an amido group, linked to the carbon by nitrogen and free from carbon atoms such as an hydrazino $$\left(\mathrm{NH_2-\overset{H}{N}-}\right)$$

hydroxamino

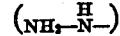

or azido

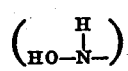

group.

Regardless of the nature of X and Y however, R in the above formula is always hydrogen or an organic group linked to the nitrogen by carbon such as an alkyl, aryl, acyl or thioacyl group or the like which groups may be substituted by other functional groups and may form a ring structure with the remaining portion of the molecule.

While any organic compound containing the characteristic structure described and being composed only of non-metallic elements is included in the broad class, it is preferred that the compounds of the broad class be organic compounds which contain the characteristic structure and which contain, in addition to carbon and hydrogen, only elements of groups V and VI of the short periods of the periodic table, i. e., nitrogen, phosphorus oxygen and sulfur.

The preferred subclass of compounds within the broad class described consists of compounds containing a carbon atom connected by a double bond to an imido group and also connected by at least one of its remaining valences to an amido nitrogen atom. Such compounds are known as amidines and include, for examples, acetamidine, trichloroacetamidine, N-methyl acetamidine and similar amidines of carboxylic acids; pseudo-urea and pseudo-thiourea (the amidines of carbonic and thiocarbonic acid) and their derivatives such as methyl-pseudo-urea and ethylene-pseudo-thiourea; guanidene (the amidine of carbamic acid) and its derivatives such as ethyl guanidine, phenyl guanidine, agmatine, vitiatine, nitro guanidine, amino guanidine, etc.; azo-dicarbondiamidine, hydrazodicarbondiamidine, azidocarbamidine and other amidines.

A still more preferred subclass of amidines consists of amidines in which the nitrogen singly bound to carbon in the amidine structure

is connected to another carbon atom (in addition to the carbon atom doubly bound to the imido group) present in an organic radical comprising an unsaturated linkage binding a pair of atoms one only of which is carbon, the unsaturated linkage being preferably no more than three atoms removed from the carbon atom doubly bound to the imido group. Of these amidines the most useful are guanidine derivatives of the formula

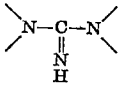

wherein at least one of the nitrogen atoms singly bound to the carbon, is connected by a single valence to a carbon atom of an organic radical containing an unsaturated linkage binding a pair of atoms only one of which is carbon (such as

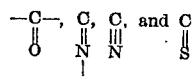

linkages), and both of thes nitrogens are connected by single valences to hydrogen atoms or carbon atoms of organic groups. Such guanidine derivatives are also described in my copending application Serial No. 515,149 filed December 21, 1943, now Patent No. 2,430,591, Nov. 11, 1947. One preferred guanidine derivative of this type is dicyandiamidine

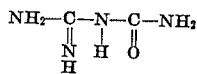

the use of which is more fully described and claimed in my copending application Serial No. 416,087 filed October 22, 1941 now Patent No. 2,380,710 July 31, 1945. Other guanidine derivatives of this preferred class (which are also, of course, amidines) include guanidinoacetic acid (or glycocyamine) glycolyl guanidine (or glycocyamidine) creatine, creatine phosphate, creatinine, guanoline, biguanidine, dicyandiamidine, guanyl thiourea (or thiocyanodiamidine), isocyanuromonimide, and isomelamine. Other amidines in this preferred subclass which are not guanidine derivatives are pseudo-thiohydantoin and acetyl-pseudo thiourea:

In addition to the amidines another type of compound within the broad class hereinabove described consists of the amidoximes, which are compounds containing the characteristic structure

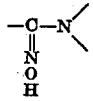

wherein the nitrogen bearing the free valences is connected to hydrogen or carbon atoms of organic groups. Examples of amidoximes include acetamidoxime and formamidoxime. Still other compounds within the broad class include compounds of the structures

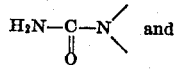 and 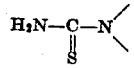

wherein the nitrogen atoms bearing the free valences are nitrogen atoms present in groups, other than amido groups, which are free from carbon atoms; and similar compounds wherein the hydrogen atoms of the —NH₂ groups are replaced by univalent organic radicals having the valence on a carbon atom. Specific examples of compounds of these types include semicarbazide, thiosemicarbazide, 4-methyl semicarbazide and the like, wherein the non-amido nitrogen in the above formula is present in an hydrazino group; carbamidooxime, wherein the non-amido nitrogen is present in an hydroxamino group; carbamic acid azide, wherein the non-amido nitrogen is present in an azido group; nitro-urea wherein the non-amido nitrogen is present in a nitroamino group and the like.

Of all the above-mentioned compounds it has been found that those which are water soluble or the water soluble hydrochlorides or sulfates of compounds of the type described (which ordinarily form such salts because of their basic character) are most effective as catalysts for the emulsion polymerization of unsaturated organic compounds; hence with this preferred method of polymerizing the use of water soluble catalysts is preferred. Specifically it has been found that dicyandiamidine or its sulfate or hydrochloride, creatine, creatinine, dicyandiamide, acetamidine, and semicarbazide or its hydrochloride are the most effective catalysts particularly for the emulsion polymerization of conjugated butadienes.

In the practice of this invention addition polymerizations of unsaturated organic compounds to form high molecular weight linear polymers are preferably carried out in aqueous emulsion in the presence of the above-described catalysts although other methods of polymerization such as polymerization in homogeneous systems may also be employed. In the emulsion polymerization process, the unsaturated compounds, or monomers, to be polymerized are emulsified in water with the aid of an emulsifying agent; a catalyst of the type described above, together, if desired, with various other substances such as initiators and modifiers of polymerization are included in the emulsion; and polymerization is then effected by agitating the emulsion until 75 to 100% of the monomers are converted into polymers, the polymerization being terminated, if desired, by the addition to the emulsion of polymerization inhibitors such as hydroquinone or phenyl beta-naphthylamine. The resulting polymerized emulsion containing polymer particles dispersed in water greatly resembles natural rubber latex and may be used as such or coagulated in the usual manner to yield the solid polymer.

The preferred methods of practicing this invention will be shown by the following specific examples which illustrate rather than limit the invention.

*Examples I and II*

A mixture containing 5.5 parts by weight of butadiene-1,3, 4.5 parts of acrylonitrile, about 25 parts of a 2% solution of myristic acid which had been 85% neutralized with sodium hydroxide, 0.035 part of phydrogen peroxide and 0.06 part of diisopropyl dixanthogen is agitated at 40° C. The polymerization requires 20 hours to reach completion. The inclusion in the emulsion however of 0.025 part of dicyandiamidine sulfate reduces the time required for the polymerization to reach completion to 14 hours, and a like reduction in the time required is achieved by the use of only 0.015 part of creatine. The products prepared in the presence of the catalysts exhibit excellent milling properties and are 100% soluble in acetone although products prepared similarly in the absence of the catalysts are difficult to mill particularly at high temperatures, and are only about 50% soluble in acetone. The products also may be vulcanized to form strong resilient vulcanizates which resist oil and abrasion to a marked degree, and are capable of use not only as a replacement for natural rubber but also in applications where rubber cannot be employed because of its inherent defects.

*Example III*

An emulsion containing 55 parts of butadiene-1,3, 45 parts of acrylonitrile, 250 parts of a 2% aqueous solution of a fatty acid soap, 0.3 part of potassium persulfate, 0.6 part of di-isopropyl dixanthogen and 0.5 part of semicarbazide is agitated for 8 hours at 60° C. and the resulting emulsion is then coagulated to produce a 98% yield of a rubbery butadiene-1,3 acrylonitrile copolymer. The polymerization requires a longer time in the absence of the semicarbazide. Moreover, the copolymer produced when the semicarbazide is employed is considerably more plastic, more tacky and possesses better milling characteristics on a hot mill than does the copolymer produced similarly in the absence of semicarbazide.

*Example IV*

An emulsion containing 12 parts by weight of butadiene-1,3, 4 parts of styrene, about 20 parts of a 3% acqueous solution of an alkyl benzene sulfonate, 0.23 part of $Na_2HPO_4 \cdot 12H_2O$, 0.06 part of potassium persulfate and 0.096 part of mixed higher aliphatic mercaptans with chains containing from 10 to 18 carbon atoms, is agitated at 45° C. The polymerization requires 44 hours to reach completion, but when 0.05 part of creatinine is added at the beginning of the polymerization the reaction is finished in only 14 hours. The product of the polymerization in the presence of the creatinine is a concentrated synthetic latex which either may be used as latex in the production of dipped goods, etc, or may be coagulated to yield a solid butadiene-1,3 styrene synthetic rubber of better working properties and higher strength than a similar rubber prepared in the absence of the creatinine.

The catalysts of this invention may also be employed in conjunction with water soluble simple or complex heavy metal compounds, in which case the polymerization proceeds more rapidly than when either catalyst is employed alone and the system will tolerate considerably higher proportions of heavy metal. The use of water soluble heavy metal compounds as catalysts is claimed in the copending applications of William D. Stewart, Serial Nos. 379,713 to 379,717 filed February 14, 1941 now Patent No. 2,380,473 and 2,380,477, July 21, 1945, and Serial No. 475,795 filed February 11, 1943. As therein disclosed, the term "heavy metal" is used to signify metals which have a density greater than four, an atomic weight greater than forty and a low atomic volume (ratio of atomic weight to density) and consequently appear substantially at the minimum points above an atomic weight of forty on Lothar Meyer's atomic volume curve. The metals appearing in the center positions of the long periods of a periodic table arranged in short and long periods, and especially those which occur in the 6th to 12th positions of the long periods (considering the alkali metals to occupy the first position and all the rare earth metals to occupy a single position), that is, metals appearing in group VIII of the Mendeléeff Periodic Table such as iron, cobalt and nickel, subgroup B of groups I and II of the Mendeléeff Periodic Table such as zinc, cadmium and mercury, and subgroup A of groups VI and VII of the Mendeléeff Periodic Table such as chromium and manganese are accordingly among the metals included in the term "heavy metal." The metals occurring in the 6th to 12th positions of the first long period, particularly those in group VIII, specifically, iron, cobalt, and nickel, are preferred.

The practice of the invention employing catalysts comprising both a water soluble heavy metal compound and a compound of the class described hereinabove is illustrated by the following example:

*Example V*

An emulsion containing the following ingredients is prepared:

| | Parts |
|---|---|
| Butadiene-1,3 | 70 |
| Styrene | 30 |
| Fatty acid soap (2% solution) | 250 |
| Hydrogen peroxide | 0.35 |
| Di-isopropyl dixanthogen | 0.45 |
| Ferrous ammonium sulfate | 0.05 |
| Creatinine | 0.50 |

The emulsion is then agitated for 23 hours at 30° C. whereupon a synthetic latex is obtained which, when coagulated produces a 98% yield of a rubbery butadiene-1,3 styrene copolymer. The copolymer is plastic and easily milled and may be compounded and vulcanized to yield strong elastic vulcanizates. When a similar emulsion is agitated without the addition of the iron salt and creatinine, over 150 hours are required for the polymerization and when the iron salt alone is used the polymerization is only 70% complete in 87 hours.

*Examples VI and VII*

A mixture of 7 parts of butadiene-1,3, 3 parts of styrene, about 25 parts of a 2% solution of fatty acid soap, 0.025 part of hydrogen peroxide and 0.045 part of diisopropyl dixanthogen, is agitated at 40° C. in the presence of 0.0005 part of ferric alum and 0.025 part of dicyandiamidine sulfate. The polymerization is complete in 28 hours although in the absence of the dicyandiamidine sulfate 109 hours is required and in the absence also of the ferric alum over 150 hours is required. The use of two heavy metals further increases the polymerization rate; for example, when 0.005 part of ferric alum and 0.0005 part of cobaltous chloride are used with the dicyandiamidine sulfate the time for polymerization is decreased to 14 hours.

*Example VIII*

When the polymerization of a mixture of the type described in the next preceding examples is repeated employing 0.00005 part of cupric sulfate and 0.25 part of dicyandiamidine sulfate as the catalysts, the polymerization is complete in 30 hours although a longer time is required when either the dicyandiamidine sulfate or the cupric salt is omitted from the recipe.

*Example IX*

An emulsion of a mixture of 55 parts of butadiene-1,3 and 45 parts of acrylonitrile containing in addition 250 parts of a 2% aqueous solution of a fatty acid soap, 10 parts a 3½% solution of hydrogen peroxide, 0.6 part of di-isopropyl dixanthogen and a catalyst consisting of 0.03 part of ferric sulfate, 0.01 part of cobaltous chloride and 0.25 part of creatine is agitated at 30° C. The polymerization requires only 8 hours to produce a plastic, coherent oil-resistant synthetic rubber possessing higher solubility and better milling characteristics on a hot mill than is ordinarily found in butadiene-1,3 acrylonitrile copolymers. Similar results are obtained by employing guanyl urea, acetamidine, dicyandiamide and similar guanidine derivatives of the type hereinabove described.

*Example X*

The polymerization of Example IX is repeated employing, in place of creatine, 0.25 part of semicarbazide hydrochloride. The polymerization requires 14 hours to reach completion and a product similar to that of Example IX is obtained. When the same polymerization is effected at 60° C. instead of 30° C., the polymerization requires only 3½ hours and the product is still a plastic, easily milled synthetic rubber which may be vulcanized to yield strong elastic vulcanizates although such excellent synthetic rubbers are not obtained at this high temperature in the absence of the carbazide hydrochloride.

From the examples it is evident that the presence of the compounds of the class described remarkably increases the speed of the polymerization. It is also to be noted that the presence of these compounds also favorably affects the properties of the polymers as by increasing their solubility and plasticity, their tack, and their ability to be milled at high temperatures. Hence the compounds described are catalysts of polymerization and also may be said to be modifiers or co-modifiers (since they are preferably employed with a sulfur-containing modifier) of polymerization because of their effect on polymer properties.

Although the preferred method of polymerization is by an emulsion polymerization as set forth in the specific examples, the compounds herein described may also be employed to accelerate the rate of polymerization in homogeneous systems in the presence or absence of solvents or diluents in the manners well known to the prior art.

The compounds of the class described when employed as catalysts according to this invention, may be employed in widely varying proportions. The use of from 0.1 to 0.5% by weight based on the polymerizable materials ordinarily gives a pronounced catalytic effect; hence such proportions are considered catalytic proportions. Greater amounts such as 1% or more can in general be employed if desired without any detrimental effects. When the catalyst also comprises a heavy metal compound, generally less than .1% of heavy metal compound, preferably in the form of a water-soluble salt, is employed, but the presence of compounds of the class described or other compounds which form complexes with heavy metal compounds permits the use of a greater concentration of heavy metal than can be employed in the absence of any complex-forming compound. If a complex-forming compound is employed, the complex-forming compound and the heavy metal compound may be added separately to the monomers prior to the polymerization, or may be reacted to form a heavy metal complex before they are added to the monomers.

The catalysts of this invention may be employed not only in the polymerization of conjugated butadienes, as in the preferred embodiment illustrated in the examples, but also in the polymerization of any unsaturated organic compounds which are capable of undergoing a truly addition polymerization to form a high molecular weight linear polymer that is a polymer having a molecular weight of at least about 10,000. Compounds which undergo such polymerizations are well known as a class to the art and in general are compounds containing a methylene ($CH_2$) group attached by an ethylenic double bond to a carbon atom. Compounds which undergo such polymerizations most readily as in aqueous emulsions also generally have the carbon atom attached to the methylene group in turn attached to an electro-negative group such as a phenyl or vinyl group, a halogen atom, a group containing a $$-\underset{\underset{O}{\|}}{C}-$$

linkage or the like. Included in this class of monomers are the conjugated butadienes including, the butadiene-1,3 hydrocarbons such as butadiene-1,3, isoprene, 2,3-dimethyl butadiene and piperylene and also the substituted butadienes-1,3 such as chloroprene and 2-cyano butadiene-1,3; aryl olefins such as styrene, vinyl naphthalene, and alpha-chlorostyrene; acrylic and alpha-substituted acrylic acids, esters, nitriles, and amides such as acrylic acid, acrylonitrile, alpha-methacrylonitrile, alpha-chloracrylonitrile, methyl acrylate, methyl methacrylate, methacrylamide and the like; vinyl halides, esters, ethers, ketones and heterocyclic vinyl compounds, such as vinylidene chloride, vinyl chloride, vinyl acetate, methyl isopropenyl ketone, vinyl furane and methyl vinyl ether as well as other unsaturated hydrocarbons and their derivatives. Any of the above compounds may be polymerized alone to form single polymers or in admixtures to form copolymers. Butadiene-1,3, for instance, may be copolymerized in aqueous emulsion with one or more monomers of the above class which are copolymerizable therewith in aqueous emulsion such as acrylonitrile, styrene, methyl acrylate, methyl methacrylate, isobutylene or the like.

As emulsifying agents which may be employed in emulsion polymerizations as in the examples there may be mentioned soaps including fatty acid soaps such as sodium oleate, potassium palmitate, and sodium myristate, and rosin and dehydrogenated rosin soaps; synthetic saponaceous materials including hymolal sulfates and alkaryl sulfonates such as sodium lauryl sulfate and sodium isopropyl naphthalene sulfonate; and salts of organic bases containing long carbon chains such as the hydrochloride of diethylaminoethyloleylamide, trimethylcetylammonium methyl sulfate, the hydrochloride of oleylamidoethyldimethylamine and the hydrochloride of the diethylaminoethoxyanilide of oleic acid. The soaps are employed in polymerizations under basic conditions, the salts of organic bases under acid conditions, and the synthetic saponaceous materials under acid, alkaline, or neutral conditions.

The polymerization may be effected by various known initiators of polymerization the use of which is illustrated in the examples, such as percompounds including hydrogen peroxide, benzoyl peroxide, ammonium persulfate, potassium persulfate, and other peroxides and persalts such as persulfates, perborates, percarbonates, and the like, as well as other types of initiators such as diazoaminobenzene, sulfur dioxide, hyposulfites, bisulfites, dipotassium diazomethane disulfonate, and triphenylmethylazobenzene. The polymerization, particularly if conducted homogeneously, may also be initiated by actinic radiation.

It is also desirable, particularly in the polymerization of conjugated butadienes to conduct the polymerization in presence of a "modifier" of polymerization, that is, a compound which increases the plasticity and solubility of polymers prepared in their presence. Effective modifiers for homogeneous polymerizations include chlorinated compounds such as carbon tetrachloride, while preferred modifiers for emulsion polymerizations are sulfur-containing compounds such as the aliphatic mercaptans and dialkyl dixanthogens, the use of which is illustrated in the examples, and also the higher tetraalkyl mono- and polysulfides, mercaptoalkylthiazoles, etc.

Other methods and procedures known to be useful in connection with the polymerization of unsaturated organic compounds are within the spirit and scope of the invention as defined in the appended claims.

This application is a continuation in part of my copending application Serial No. 416,087 filed October 20, 1941, now Patent No. 2,380,710, July 31, 1945.

I claim:
1. The method which comprises polymerizing in an aqueous emulsion in which the sole emulsifying agent is a soap a mixture of butadiene-1,3 and styrene in the presence of a catalytic amount which is from 0.1 to 1.0% by weight based on the amount of material polymerized, of creatinine.

2. The method which comprises polymerizing in an aqueous emulsion in which the sole emulsifying agent is a soap a mixture of butadiene-1,3 and styrene in the presence of a catalytic amount of a water soluble salt of a heavy metal occurring in group VIII and the first long period of the periodic table, and in the presence of a catalytic amount which is from 0.1 to 1.0% by weight based on the amount of material polymerized, of creatinine.

3. The method which comprises polymerizing in an aqueous emulsion in which the sole emulsifying agent is a soap a mixture of butadiene-1,3 and acrylonitrile in the presence of a catalytic amount which is from 0.1 to 1.0% by weight based on the amount of material polymerized, of creatine.

4. The method which comprises polymerizing in an aqueous emulsion in which the sole emulsifying agent is a soap a mixture of butadiene-1,3 and acrylonitrile in the presence of a catalytic amount of a water soluble salt of a heavy metal occurring in group VIII and the first long period of the periodic table, and in the presence of a catalytic amount which is from 0.1 to 1.0% by weight based on the amount of material polymerized, of creatine.

5. The method which comprises polymerizing a butadiene-1,3 hydrocarbon in an aqueous emulsion in which the sole emulsifying agent is soap in the presence of a catalytic amount which is from 0.1 to 1.0% by weight based on the amount of material polymerized, of a compound selected from the class consisting of creatine and creatinine.

WILLIAM D. STEWART.

REFERENCES CITED

The following references are of record in the file of this patent:

UNITED STATES PATENTS

| Number | Name | Date |
|---|---|---|
| 1,935,733 | Tschunkin | Nov. 21, 1933 |
| 2,197,357 | Widmer | Apr. 16, 1940 |
| 2,211,032 | Seidler | Aug. 13, 1940 |
| 2,234,076 | Gumlich | Mar. 4, 1941 |
| 2,234,204 | Starkweather | Mar. 11, 1941 |
| 2,265,722 | Nie | Dec. 9, 1941 |
| 2,317,181 | D'Alelio | Apr. 20, 1943 |
| 2,380,618 | Stewart et al. | July 31, 1945 |
| 2,380,710 | Stewart | July 31, 1945 |

FOREIGN PATENTS

| Number | Country | Date |
|---|---|---|
| 255,129 | Germany | Dec. 20, 1912 |
| 318,115 | Great Britain | Aug. 26, 1929 |